United States Patent Office 3,775,449
Patented Nov. 27, 1973

3,775,449
SEPARATION OF MONO- AND DI-NEO ACIDS
Bertram Yeomans, Hessle, England, assignor to BP
Chemicals Limited, London, England
No Drawing. Filed Apr. 22, 1971, Ser. No. 136,609
Claims priority, application Great Britain, Apr. 28, 1970,
20,318/70
Int. Cl. C07c 51/42, 51/48
U.S. Cl. 260—419
9 Claims

ABSTRACT OF THE DISCLOSURE

Separation of di-neo acids from admixture with mono-neo acids by adding to the mixture, dissolved in strong acid, an amount of water to give a molar ratio of water and formic acid (where present) to strong acid of 0.5:1 to 1:1 to liberate the mono acid, and adding further amounts of water to increase the aforesaid ratio to 1.3:1 to 3:1 to liberate the diacid.

---

The present invention relates to the separation of mono-neo and di-neo carboxylic acids.

Di-neo acids in which the neo-acid groups are separated by at least 3 carbon atoms may be made by the process of our copending application U.S. Ser. No. 835,778, now U.S. 3,609,185.

In this process an $\alpha,\omega$-diisoalkylalkene, or an $\alpha,\omega$-diisoalkyl alkadiene preferably with at least one of the double bonds not in the terminal position, the alkene or alkadiene having at least three carbon atoms separating the isoalkyl groups, is reacted with formic acid in the presence of concentrated sulphuric acid or with carbon monoxide in the presence of a mineral or Lewis acid.

A neo-acid is a carboxylic acid in which the carboxylic acid group is linked to a carbon atom whose other valencies are all satisfied by carbon atoms.

By "neo-acid group" throughout this specification we mean the group

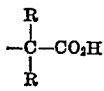

where R is alkyl. The remaining valency will be satisfied carbon.

An iso-alkyl group is a group consisting of a carbon atom, a hydrogen atom and two alkyl groups bound to the carbon atom, the remaining valency of the carbon atom being satisfied by carbon.

The isoalkyl group may be represented by

where R is alkyl, and the remaining valency is satisfied by carbon.

An example of a di-neo acid which may be produced is 2,2,7,7-tetramethylsuberic acid (which may also be referred to as 2,2,7,7-tetramethyloctane-1,8-dioic acid).

In the process for making di-neo-acid, mono-neo-acids are also produced. The mono-neo-acid may have a similar skeleton to the starting olefin and its di-neo-acid product; but with one less carbon atom than the di-acid. Thus, the mono-neo-acid corresponding to 2,2,7,7 - tetramethylsuberic acid produced from 2,7-dimethyloctene-4 is 2,2,7-trimethyloctanoic acid. Mono-neo-acids of differing skeleton and molecular weight may also be produced from olefin impurities or additives to the olefin feed or by fragmentation of the olefin feed or its mono-neo-acid product or products. The present invention relates to the separation of di-neo-acids from the mono-neo-acids produced as described above. The separation process is also applicable to mixtures obtained by the conversion of mono-neo-acids (e.g. 2,2,7-trimethyloctanoic acid) to its corresponding di-neo-acid by treating with a strong acid, e.g. concentrated sulphuric acid, as described in our co-pending application U.S. Ser. No. 70,527, now U.S. 3,703,549 and to Belgian Pat. 755,997.

According to the present invention the process for separating a di-neo acid from co-produced mono-neo acid comprises adding to the protonated di- and mono-neo-acid dissolved in strong acid a quantity of water sufficient to give a ratio of moles of water plus twice the number of moles of di-neo-acid plus the number of moles of formic acid, where present to number of moles of strong acid of from 0.5:1 to 1:1 to liberate the mono-neo-acid; separating the mono-neo acid from the partially diluted strong acid; and adding a further quantity of water to the partially diluted strong acid to give a molar ratio of water and formic acid, where formic acid is present, to strong acid of at least 1.3:1 to liberate the di-neo acid.

The protonated di-neo acid preferably contain not more than 22 carbon atoms in the molecule. The two neo-acid groups are most preferably separated by at least 3 carbons.

The alkyl groups linked to the 2 carbon atom, i.e., the carbon atom next adjacent to the carboxyl group, preferably contain 1 to 9 carbon atoms, both in the case of the di-neo and the mono-acid.

The process of the present invention is applied to the neo-acids in their protonated form. The neo-acids will be produced initially in this form when the $\alpha,\omega$-diisoalkenes and $\alpha,\omega$-diisoalkadienes referred to above are reacted with formic acid in cocentrated sulphuric acid as catalyst. The carboxyl groups of a neo-acid may be represented in unprotonated form as

and in the protonated form as

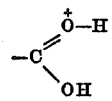

Where the alkene or alkadiene is reacted with carbon monoxide in a strong mineral acid or Lewis acid acyl cations containing acyl cation groups may be represented as

are formed as the precursors of the neo acids. The precursor of a di-neo acid will contain two acyl cation groups.

The acyl cation group may be converted to the protonated neo-acid group by addition of such a quantity of water that the number of moles of added water equals the number of gram moieties of acyl cation groups. The gram moiety is the sum of the atomic weight in grams of the component atoms of the acyl cation group

If only compounds containing two acyl cation groups were present the molar ratio of added water to such compound would be 2:1, but because some mono-acid precursor is present it is necessary to consider the total number of acyl cation groups.

As indicated above the protonated neo-acids may be formed by controlled addition of water to the acyl cations, and this step may be combined with the addition of water to cause separation of the mono-neo acid. Thus the quantity of water added may include an amount calculated as being sufficient to convert the acyl cation groups to protonated carboxylic acid groups in addititon to that calculated as giving the desired ratio of water, di-neo acid, and formic acid where present, to strong acid of 0.5:1 to 1.3:1.

The quantity of water added is preferably such as to give a sulphuric acid concentration of 90.5% ±2% wt./wt. The sulphuric acid concentration is calculated on the basis that only sulphuric acid and water are present, other substances being neglected.

The strong acid in which the protonated neo-acids are dissolved may be a mineral acid or a Lewis acid. It is preferred to use concentrated sulphuric acid. The concentration of the sulphuric acid should be greater than 92.5% wt./wt., preferably not less than 95% wt./wt., most preferably between 97% and 100% wt./wt. Other mineral acids which may be used are phosphoric or hydrofluoric acids. Among Lewis acids which may be used are boron trifluoride and its complexes with mineral acids.

The relative proportions of protonated di- and mono-neo acids to strong acid may vary over a wide range.

The liberated mono-neo acid may be recovered in any convenient manner, most conveniently by extraction of the partially diluted strong acid with a water immiscible solvent e.g. acyclic or alicyclic hydrocarbons or their chlorinated derivatives e.g. 2,7-dimethyloctane, cyclohexane, or tetrachloroethylene.

When the mono-neo acid has been separated from the partially diluted strong acid, a further quantity of water is added to liberate the di-neo acid. The quantity of water should be such as to give a molar ratio of total moles of water and formic acid, if present, to strong acid of at least 1.3:1. Where the acid catalyst is to be reused and it is necessary to reconcentrate it, it is preferred to add water to give a molar ratio of total moles of water and formic acid to strong acid of not more than 3:1. Thus when using concentrated sulphuric acid as the strong acid the quantity of water may be such as to give a concentration of less than 80% wt./wt. $H_2SO_4$ preferably 70% wt./wt. The concentration of sulphuric acid is calculated on the basis of the sulphuric acid and water contents only, the presence of other substances, e.g., di-neo acids being neglected.

As explained above mixtures of protonated mono- and di-neo acids in strong acids, suitable for separation by the process of the present invention, may be made by the reactions of defined alkenes and alkadienes with formic acid or carbon monoxide as has been previously described in this specification. Thus mixtures of protonated 2,2,7,7-tetramethyl suberic acid and protonated 2,2,7-trimethyloctanoic acid may be made from 2,7 - dimethyloctenes preferably 2,7-dimethyloctene-4.

The reaction of the alkene or alkadiene may be carried out at 0° to 35° C. when using formic acid and 0° to 100° C. preferably 15° to 45° when using carbon monoxide.

The reaction with formic acid may be carried out over a moderately wide range of pressures but atmospheric pressure is convenient. The reaction with carbon monoxide may be carried out at pressures in the range 1-200 atmospheres but it is preferred to use pressures of 10-100 atmospheres.

The quantity of strong acid used in the reaction is for example preferably within the range of 1 to 10 mol/mol of olefin or diene.

The invention will now be illustrated by reference to the accompanying examples, in which the abbreviations "TMO," "TMS" and "GLC" mean respectively 2,2,7-trimethyloctanoic acid, 2,2,7,7-tetramethylsuberic acid, and gas-liquid chromatography. In those examples where reference is made to concentrations of the catalyst it is to be understood that only the water and sulphuric acid contents of the mixture are used to calculate the sulphuric acid concentration, the presence of neo-acids or neo-acid precursors being ignored.

Example 1.—Carbon monoxide-based preparation 2,7 - dimethyloctene-4 (1 mol) in tetrachloroethylene (100 ml.) was added gradually over 3.9 h. to 97% w./w. sulphuric acid (813 g.) in an autoclave at 37.3 kg./cm.² (515 p.s.i.g.) of carbon monoxide, under stirring. The temperature of the reactants rose from 19° to 29° C. during the addition. The pressure was then reduced to atmospheric pressure and the mixture was stirred at ambient temperature for a further 3 h. The organic phase (tetrachloroethylene and 2,7-dimethyloctane) was then separated from the catalyst phase which contained TMS (0.398 mol) and TMO (0.198 mol). The catalyst phase was divided into two halves for separate work-up.

(i) One aliquot was diluted to 90% w./w. $H_2SO_4$ with water (32 g. equivalent to 0.5 mol $H_2O$/1 mol $H_2SO_4$) at 30 to 40° C. and was then extracted with cyclohexane (3× 100 ml.). The cyclohexane extracts contained TMO (0.081 mol=81.8% recovery from the catalyst raffinate) but was free of TMS (GLC analysis).

(ii) The second aliquot was diluted to 88% w./w. $H_2SO_4$ with water (41.6 g. equivalent to 0.58 mol $H_2O$/mol $H_2SO_4$) and was then extracted with cyclohexane (3× 100 ml.). The cyclohexane extracts which contained TMO (0.083 mol=84% recovery) were free of TMS.

Example A.—Without partial water quench (not according to the invention)

2,2,7 - trimethyloctanoic acid (0.22 mol) was added quickly to 97% w./w. $H_2SO_4$ (822 g.) at ambient temperature, in an autoclave at 36.2 kg./cm.² (500 p.s.i.g.) of carbon monoxide and the mixture was then allowed to stand for 23 h. 2.7-dimethyloctene-4 (1 mol) in tetrachloroethylene (100 ml.) was then added gradually to the mixture over 3.8 h. under stirring. The temperature of the reactants rose from 18 to 28° C. during the addition. The pressure was then reduced to atmospheric pressure and the mixture was stirred at ambient temperature for a further 3 h.

The reaction product was quenched with ice (300 g. equivalent to 2.1 mol $H_2O$/1 mol $H_2SO_4$) to dilute the catalyst to ca. 72% w./w. $H_2SO_4$ and the precipitated TMS was filtered and washed free of catalyst on the filter bed with water (4× 100 ml.).

The reaction product consisted of TMS (0.422 mol) and TMO (0.359 mol). A small quantity only of the TMO (0.0056 mol) was separated into the mother liquors at the filtration stage giving a TMS filtration residue (161 g. after drying containing 59.5% w./w. TMS) heavily contaminated with TMO.

Example 2

TMO (0.22 mol) was re-arranged to TMS in an autoclave with 97% w./w. $H_2SO_4$ (825 g.) at 35.9 kg./cm.² (510 p.s.i.g.) of carbon monoxide over 23 h. at ambient temperature. 2.7-dimethyloctene-4 (1 mol) in tetrachloroethylene (100 ml.) was added over 3.9 h. under stirring at 13 to 24° C. The pressure was then reduced to atmospheric pressure and the mixture was stirred for a further 0.5 h.

The reaction product was partially quenched with aqueous 50% w./w. $H_2SO_4$ (168 g. equivalent to 0.52 mol $H_2O$/mol $H_2SO_4$) to ca. 90% w./w. $H_2SO_4$. The organic phase was separated and the catalyst raffinate was extracted with cyclohexane (2× 100 ml.). The solvent extracts contained TMS-free TMO (0.45 mol) which amounted to 90% of the TMO originally present in the reaction product.

The catalyst raffinate was then further quenched with water (205 g. equivalent to 1.3 mol $H_2O$/mol $H_2SO_4$) to dilute the catalyst to ca. 75% w./w. $H_2SO_4$ and the precipitated TMS was filtered and washed free of catalyst on the filter bed with water (4× 200 ml.). The TMS filtration residue after drying (0.35 mol) contained 90% w./w. of TMS.

These results show that the partial quench technique gives an efficient separation of pure TMO immediately suitable for conversion to TMS and also gives a TMS product of increased purity.

Comparative example.—Without partial water quench (not according to the invention)

Formic acid (1.5 mol of 99% w./w.) and 2,7-dimethyl-octene-4 (1 mol) dissolved in tetrachloroethylene (100 ml.) were added under stirring (750 r.p.m.) to a round bottom flask (1 l.) which contained sulphuric acid (4 mol of 99% w./w.) so that a slight excess of formic acid over the olefin was always present in the reactor. The additions were carried out over 4 h. at 3 to 13° C. Water (400 g. equivalent to 5.5 mol $H_2O$/mol $H_2SO_4$) was then added to the reaction product to dilute the catalyst to ca. 50% w./w. $H_2SO_4$. The precipitated TMS was filtered and was washed (2× 35 ml. cyclohexane, 3× 200 ml. water, 50 ml. acetone) on the filter bed. The TMS filtration residue after drying (0.314 mol) consisted of 91.7% w./w. TMS and 8.3% w./w. TMO. TMO (0.158 mol) which contained a little TMS (0.020 mol) was recovered from the filtration mother liquors by partition.

Example 3.—With the partial water quench (i) The preparative procedure described above for the comparative example was repeated but the reaction product was then partially quenched with water (28 g. equivalent to 0.4 mol $H_2O$+0.15 mol unreacted HCOOH/mol $H_2SO_4$. The organic phase was then separated and the catalyst raffinate was extracted with cyclohexane (2× 100 ml.). The solvent extracts contained TMS-free TMO (0.203 mol) which amounted to 92% of the TMO originally present in the reaction product.

The catalyst raffinate was then further quenched with water (360 g. equivalent to 4 mol $H_2O$/mol $H_2SO_4$) and the precipitated TMS was separated by filtration and was washed with water (4× 200 ml.). The TMS filtration residue after drying (0.302 mol) contained 95.5% w./w. TMS.

(ii) The preparative procedure described above for the comparative example was again repeated but the reaction product was then partially quenched with water (38 g. equivalent to 0.42 mol $H_2O$+0.15 mol unreacted HCOOH/1 mole $H_2SO_4$). TMS-free TMO (0.235 mol) was obtained by partition (3× 100 ml. cyclohexane) and this amount to 98% of the TMO originally present. The catalyst raffinite was then further quenched with water (350 g. equivalent to 3.9 mol $H_2O$/mol $H_2SO_4$) and the precipitated TMS was filtered and waterwashed (4× 200 ml.). The TMS filtration residue after drying (0.275 mol) contained 98.6% w./w. TMS.

I claim:
1. The process for separating an alkane di-neo carboxylic acid having not more than 22 carbon atoms from a mixture of said di-neo carboxylic acid and an alkane mono neo carboxylic acid having no more than 22 carbon atoms or from a said mixture additionally containing formic acid which comprises adding to a solution of the protonated di- and mono-neo carboxylic acids in concencentrated sulphuric acid having a concentration greater than 92.5% wt./wt. a quantity of water sufficient to give a ratio of moles of water plus twice the number of moles of di-neo carboxylic acid plus the number of moles of any formic acid present, to number of moles of sulfuric acid of from 0.5:1 to 1:1; separating the mono-neo carboxylic acid thereby liberated from the partially diluted sulphuric acid; adding a further quantity of water to the partially diluted sulphuric acid to give a molar ratio of water, and any formic acid present, to sulphuric acid of at least 1.3:1; and separating the di-neo carboxylic acid thereby liberated.

2. The process according to claim 1 wherein the quantity of water added to the partially diluted sulphuric acid is such as to give a molar ratio of water and any formic acid present, to strong acid of not more than 3:1.

3. The process according to claim 1 wherein alkyl groups containing 1 to 9 carbon atoms are linked to the 2 carbon atom of the neo acids.

4. The process according to claim 1 wherein the mono-neo carboxylic acid contains one less carbon atom than the di-neo carboxylic acid.

5. The process according to claim 1 wherein the concentration of the sulphuric acid is not less than 95% wt./wt. based on total weight of sulphuric acid and water.

6. The process according to claim 1 wherein the protonated neo-acids are formed by the addition of water to precursors having the same carbon skeleton as the neo carboxylic acids but containing

cation groups in place of

groups.

7. The process according to claim 6 wherein the precursors containing acyl cation groups are derived from the reaction of an α,ω-diisoalkylene, or an α,ω-diisoalkyl alkadiene with at least one of the double bonds not in the terminal position, the alkene or alkadiene having at least three carbon atoms separating the isoalkyl groups, with carbon monoxide in the presence of a strong mineral or Lewis acid, and sufficient water is added to give a sulphuric acid concentration based on total weight of sulphuric acid and water of 90.5%±2% wt./wt. so as to cause separation of the mono-neo carboxylic acid.

8. The process according to claim 1 wherein the mono-neo carboxylic acid liberated by addition of water is recovered by extraction of the partially diluted sulphuric acid with a hydrocarbon or a chlorinated hydrocarbon solvent.

9. The process according to claim 1 wherein after the mono-neo carboxylic acid has been separated a quantity of water is added such as to give sulphuric acid having a concentration of less than 80% wt./wt. based on total weight of sulphuric acid and water.

References Cited

FOREIGN PATENTS 6909915  12/1969  Netherlands _____ 260—533

VIVIAN GARNER, Primary Examiner

U.S. Cl. X.R.

260—413, 533 A, 537 R, 540